(12) United States Patent
Huemmer et al.

(10) Patent No.: US 12,444,047 B2
(45) Date of Patent: Oct. 14, 2025

(54) AUTOMATIC ANALYSIS OF 2D MEDICAL IMAGE DATA WITH AN ADDITIONAL OBJECT

(71) Applicant: Siemens Healthineers AG, Forchheim (DE)

(72) Inventors: Christian Huemmer, Lichtenfels (DE); Sven-Martin Sutter, Herzogenaurach (DE); Sailesh Conjeti, Pinneberg (DE)

(73) Assignee: Siemens Healthineers AG, Forchheim (DE)

( * ) Notice: Subject to any disclaimer, the term of this patent is extended or adjusted under 35 U.S.C. 154(b) by 488 days.

(21) Appl. No.: 17/950,465

(22) Filed: Sep. 22, 2022

(65) Prior Publication Data

US 2023/0098022 A1  Mar. 30, 2023

(30) Foreign Application Priority Data

Sep. 24, 2021 (EP) .................................... 21198823

(51) Int. Cl.
*G06T 7/11* (2017.01)
*G06T 7/00* (2017.01)

(52) U.S. Cl.
CPC .............. *G06T 7/0012* (2013.01); *G06T 7/11* (2017.01); *G06T 2207/10068* (2013.01); *G06T 2207/20081* (2013.01)

(58) Field of Classification Search
CPC ...... G06T 7/0012; G06T 7/11; G06T 2207/10068; G06T 2207/20081; G06T 2207/30021; G06T 7/174; G06T 2207/10024; G06T 2207/10116
USPC ......................................................... 382/128
See application file for complete search history.

(56) References Cited

U.S. PATENT DOCUMENTS

| | | | |
|---|---|---|---|
| 8,098,914 B2* | 1/2012 | Liao | G06V 10/24 382/128 |
| 2012/0041779 A1* | 2/2012 | Boroczky | G16H 40/63 705/2 |
| 2017/0084036 A1 | 3/2017 | Pheiffer et al. | |

OTHER PUBLICATIONS

Wang, Leijing: "Novel Techniques for Integrating Video Augmented X-ray Imaging into Orthopedic and Trauma Surgery"; Dissertation; XP055465501; URL: https://mediatum.ub.tum.de/doc/1098340/192698.pdf; 2012.
Yi et al.: "Automatic catheter detection in pediatric X-ray images using a scale-recurrent network and synthetic data", arXiv:1806.00921v1 [cs.CV] Jun. 4, 2018.
Subramanian V. et al.:"Automated Detection and Type Classification of Central Venous Catheters in Chest X-Rays", Jul. 2019, [Sub19] https://www.researchgate.net/publication/334223370_Automated_Detection_and_Type_Classification_of_Central_Venous_Catheters_in_Chest_X-Rays.
Jensen L. et al.:"Reducing errors in portable chest radiography." Applied Radiology 44.4 (2015): 7-15.

(Continued)

*Primary Examiner* — Charlotte M Baker
(74) *Attorney, Agent, or Firm* — Harness, Dickey & Pierce, P.L.C.

(57) ABSTRACT

A method for automatically analysing 2D medical image data, including an additional object comprises acquiring the 2D medical image data from an examination portion of a patient using a first modality; acquiring additional image data from the examination portion using a different modality; and performing an automatic image analysis based on the acquired 2D medical image data and the acquired additional image data, the image analysis being adapted to the additional object.

16 Claims, 4 Drawing Sheets

(56) References Cited

OTHER PUBLICATIONS

Yi et al. (2020), "Computer-Aided Assessment of Catheters and Tubes on Radiographs—How Good is Artificial Intelligence for Assessment?", https://arxiv.org/abs/2002.03413 Stand: Jul. 24, 2020.
Lee et al. "A Deep-Learning System for Fully-Automated Peripherally Inserted Central Catheter (PICC) Tip Detection", J Digit Imaging. Aug. 2018;31(4):393-402. doi: 10.1007/s10278-017-0025-z. PMID: 28983851; PMCID: PMC6113157.
Hansen L. et al.:"Radiographic Assessment of CVC Malpositioning: How can AI best support clinicians?", Medical Imaging with Deep Learning—Under Review 2021.
Havaei, Mohammad et al: "Brain tumor segmentation with Deep Neural Networks"; Medical Image Analysis; vol. 35; pp. 18-31; XP055866855; ISSN: 1361-8415; DOI: 10.1016/j.media.2016.05.004; 2016;.
Pauly, Olivier et al: "Machine learning-based augmented reality for improved surgical scene understanding"; Computerized Medical Imaging and Graphics.; vol. 41; pp. 55-60; XP055468353; ISSN: 0895-6111; DOI: 10.1016/j.compmedimag.2014.06.007; 2015.

\* cited by examiner

AUTOMATIC ANALYSIS OF 2D MEDICAL IMAGE DATA WITH AN ADDITIONAL OBJECT

CROSS-REFERENCE TO RELATED APPLICATION(S)

The present application claims priority under 35 U.S.C. § 119 to European Patent Application No. EP 21198823.3, filed Sep. 24, 2021, the entire contents of which are incorporated herein by reference.

FIELD

One or more example embodiments of the present invention relates to a method for automatically analysing 2D medical image data, comprising an additional object. One or more example embodiments of the present invention also concerns an analysis device. Further, One or more example embodiments of the present invention relates to a medical imaging system.

BACKGROUND

The placement and insertion of external devices is used very often in clinical practice for life-supporting purposes and for patient monitoring. For instance, tracheal tubes are usually used for ventilation, whereas venous catheters are typically inserted for medication or pressure monitoring. One major challenge in analysing two-dimensional medical images with external devices is the projection of extracorporeal and inserted objects into one image plane, which superimposes densities from external devices over internal tissue structures. This effect complicates image interpretation by obscuration of important findings by overlying medical equipment.

Using deep learning for detecting and identifying equipment may be possible under the supposition that large enough training datasets are available used for the purpose that image analytics applications intrinsically learn to differentiate between extracorporeal objects and inserted devices. A prominent example is the position assessment of central venous catheters, which was treated by researchers in Subramanian et al. "Automated Detection and Type Classification of Central Venus Catheters in Chest X-rays", https://arxiv.org/abs/1907.01656 and Hansen et al. "Radiographic Assessment of CVC Malpositioning: How can AI best support clinicians?", https://openreview.net/pdf?id=ImcP8kkqtfZ.

However, this strategy automatically leads to the necessity of exploiting large training datasets to capture any kind of variable produced by extracorporeal devices, which appears to be especially challenging, e.g., in intensive care unit situations of high intrinsic image diversity.

A second possibility to improve image analytics applications is to segment any kind of external and inserted objects. For instance, the authors in Lee et al. "A Deep-Learning System for Fully-Automated Peripherally Inserted Central Catheter (PICC) Tip Detection", https://dx.doi.org/10.1007/s10278-017-0025-z identified the tip position of peripherally inserted central catheters by simultaneously segmenting and categorizing other inserted and extracorporeal devices just as well. Of course, this comes at the cost of a very high annotation complexity.

An additional possibility to consider various extracorporeal devices without using large training datasets and annotation efforts is to artificially create synthetic cases. Such an approach is described in Yi et al. "Automatic Catheter and Tube Detection in Pediatric X-ray Images Using a Scale-Recurrent Network and Synthetic Data", https://arxiv.org/pdf/1806.00921.pdf. A risk of this approach is the potential mismatch between training and test conditions due to concept drift.

SUMMARY

Hence, there is a problem to achieve a high quality in analysing medical image data from an examination object comprising extracorporeal devices and intracorporeal devices.

The before-mentioned problem is solved by a method for automatically analysing 2D medical image data, comprising an additional object, according to one or more example embodiments, by an analysis device according to one or more example embodiments and by a medical imaging system according to one or more example embodiments.

According to one or more example embodiments, a method for automatically analysing 2D medical image data including an additional object comprises acquiring the 2D medical image data from an examination portion of a patient using a first modality; acquiring additional image data from the examination portion using a different modality; and performing an automatic image analysis based on the acquired 2D medical image data and the acquired additional image data, the image analysis being adapted to the additional object.

According to one or more example embodiments, the additional object comprises an external object.

According to one or more example embodiments, the performing the automatic image analysis comprises performing a separate first analysis of the additional image data, and performing a subsequent second analysis of the medical image data based on the results of the first analysis.

According to one or more example embodiments, the first analysis comprises at least one of identifying the additional object in the additional image data or localizing the additional object in the additional image data.

According to one or more example embodiments, the additional image data comprise external image data.

According to one or more example embodiments, the performing the first analysis includes, extracting information of at least one of the type of the external object from the external image data or the position of the external object from the external image data, identifying the at least one of the type of the external object from the external image data or the position of the external object from the external image data, choosing a dedicated medical image analytics application for at least one of identifying the external object in the medical image data or localizing the external object in the medical image data based on a preceding at least one of identifying the external object in the medical image data or localizing the external object in the medical image data; and the performing the second analysis includes at least one of identifying the external object in the medical image data or localizing the external object in the medical image data based on the medical image analytics application.

According to one or more example embodiments, the extracting comprises detection a course of the external object in the external image data, and the choosing the dedicated medical image analytics application comprises adapting an analytics application.

According to one or more example embodiments, the adapting the analytics application comprises considering the course of the external object by at least one of: suppressing medical image regions of an overlaying external object, weighting segmentation or heatmap regression results, or treating separately medical image sub-regions with the overlaying external object.

According to one or more example embodiments, the performing the first analysis comprises detecting at least one of an insertion place or a type of a partly extracorporeal device.

According to one or more example embodiments, the partly extracorporeal device comprises a port catheter with a cover comprising a pattern, the pattern changes from a tip to a port device, and the performing the first analysis comprises at least one of: identifying the type of the port catheter based on the cover pattern, localizing the insertion place of the port catheter based on the cover pattern, and estimating the insertion depth based on the cover pattern.

According to one or more example embodiments, the performing the analysis performs the analysis as a multimodel, artificial intelligence based analysis based on a combination of the additional image data and the medical image data.

According to one or more example embodiments, an analysis device comprises a first input interface configured to acquire 2D medical image data from an examination portion of a patient acquired by a first modality, the 2D medical image data including an additional object; a second input interface configured to acquire additional image data from the examination portion using a different modality; and an analysis unit configured to perform an automatic image analysis based on the acquired 2D medical image data and the acquired additional image data, adapted to the additional object.

According to one or more example embodiments, a medical imaging system comprises a scan unit configured to acquire measuring data from an examination portion of a patient, a reconstruction unit configured to reconstruct image data based on the acquired measuring data, the analysis, and an additional modality configured to acquire additional image data from the examination portion.

According to one or more example embodiments, a non-transitory computer program product with a computer program, which can be loaded directly into a memory device of a medical imaging system, has program sections to cause the medical imaging system to perform a method according to one or more example embodiments, when the computer program is carried out in the medical imaging system.

According to one or more example embodiments, a non-transitory computer readable medium storing program sections that, when executed by a computer unit, cause the computer unit to perform a method according to one ore more example embodiments.

BRIEF DESCRIPTION OF THE DRAWINGS

One or more example embodiments of the present invention are explained below with reference to the figures enclosed once again. The same components are provided with identical reference numbers in the various figures.

The figures are usually not to scale.

DETAILED DESCRIPTION

According to the method for automatically analysing 2D medical image data, comprising an additional object, the 2D medical image data are acquired from an examination portion of a patient, also named region of interest.

In general, the additional object is defined as an object, which is intended to be distinguished, but which is not able to be distinguished or very hardly distinguishable from a part of the patient's body or other parts of the patient's body, which are located at the same position as the position of the additional object or next to the position of the additional object in the 2D medical image data, exclusively based on the information of the acquired 2D medical image data. For example, the additional object comprises a foreign object, which is usually not part of a body of a healthy person or which comprise material, which differs from the tissue of a healthy person.

In that context it has to be mentioned explicitly that the expression "an additional object" also comprises the case of more than one additional objects. In particular, the expression "additional object" comprises every kind of external object, i.e. an object, which is positioned outside the body of a patient. For example in a typical case, there may be a plurality of external objects on the body of a patient. Such external objects may comprise catheter ports, ECG devices (ECG=electro cardiogram), electric cables, tracheal tubes or hoses, etc. A patient can be a human being or an animal. The medical images can comprise, for example, X-ray images, also a 2D projection of CT-images or MR-images.

Additional image data are also acquired from the examination portion, however using a different modality. The different modality comprises a different technical type and therefore, the image information acquired by the different modality differs from the image information of the medical image data. For example, the different modality for acquiring the additional image data uses a different physical principle compared to the modality for acquiring the 2D medical image data. Due to the different modality, the information about the additional object, which can be extracted from the additional image data, is different from the information about the additional object from the 2D medical image data. The additional image data may also comprise 2D image data, but they are not limited thereto. For example, the additional image data can also comprise 3D image data acquired by a 3D image acquisition unit.

Preferably, the 2D medical image data comprise information about the interior human body and the additional image information of the different modality comprises information about the outer side of the human body. However, example embodiments are not limited to the preferred variant. As later discussed, the different modality can also comprise an acquisition technique, which illustrates the intensity of metabolism inside the human body for identifying and localizing tumors. In that case, the "additional object" comprises the tumor, which has to be distinguished from bones or other part of the interior body of a patient.

Further, an automatic image analysis is performed based on the acquired 2D medical image data and the acquired additional image data, adapted to the additional object. As later discussed, the result of the analysis can comprise an identification or localization of the additional object, preferably an external object in the 2D medical image data and/or the additional image data. As also later discussed, the information from both modalities can be used separately for subsequent analysis sub-steps or in a joint manner for a single analysis step. The result of the analysis can also comprise a segmentation of the examination portion, annotations, or information, which can be used for an appraisal or diagnosis.

Advantageously, an additional data source, comprising information about the examination portion and in particular additional information about the additional object, is used to improve medical image analytics applications. In particular, an identification and differentiation of objects, which are located at the same position or at a similar position in a 2D medical image, can be realized based on the additional image information. As later explained in detail, such medical image analytics applications can comprise improved applications for an examination process and automatic post processing algorithms, which are adapted to the identity, position and extension of the additional object.

The analysis device according to one or more example embodiments of the present invention comprises a first input interface for acquiring 2D medical image data from an examination portion of a patient.

The examination portion includes an additional object, which is intended to be distinguished, but which is not able to be distinguished or very hardly distinguishable from a part of the patient's body or other parts of the patient's body positioned at the same position or next to the position of the additional object in the 2D medical image data, exclusively based on the information of the acquired 2D medical image data.

As mentioned above, the acquired 2D medical image data can be supplied from a plurality of different types of medical imaging systems like X-ray imaging systems, CT-systems or MR-systems. The analysis device also includes a second input interface for acquiring additional image data from the examination portion using a different modality. As also mentioned above, the different modality comprises preferably, but not limited thereto, a technical means for acquiring image data of the outer side of the human body. Further, the analysis device also encompasses an analysis unit for performing an automatic image analysis based on the acquired 2D medical image data and the acquired additional image data, adapted to the additional object. The analysis device shares the advantages of the method for automatically analysing 2D medical image data.

The medical imaging system, preferably an X-ray imaging system, according to one or more example embodiments of the present invention comprises a scan unit for acquiring measuring data from an examination portion of a patient, a reconstruction unit for reconstructing image data and generating 2D medical image data based on the acquired measuring data and an analysis device according to one or more example embodiments of the present invention. Further, the medical imaging system comprises an additional modality for acquiring image data from the examination portion, wherein the additional modality is technically different from the primary modality of the medical imaging system. The medical imaging system shares the advantages of the analysis device according to one or more example embodiments of the present invention.

Some components of the analysis device according to one or more example embodiments of the present invention can for the most part be designed in the form of software components. This applies in particular to the analysis unit, but also parts of the input interfaces. In principle, however, some of these components can also be implemented in the form of software-supported hardware, for example FPGAs or the like, especially when it comes to particularly fast calculations. Likewise, the required interfaces, for example if it is only a matter of transferring data from other software components, can be designed as software interfaces. However, they can also be designed as hardware-based interfaces that are controlled by suitable software. Furthermore, some parts of the above-mentioned components may be distributed and stored in a local or regional or global network or a combination of a network and software, in particular a cloud system.

A largely software-based implementation has the advantage that medical imaging systems that have already been used, can easily be retrofitted by a software update in order to work in the manner according to one or more example embodiments of the present invention. In this respect, the object is also achieved by a corresponding computer program product with a computer program that can be loaded directly into a memory device of, for example a medical imaging system, with program sections, in order to carry out all steps of the method according to one or more example embodiments of the present invention, if the program is executed in the medical imaging system. In addition to the computer program, such a computer program product may contain additional components such as a documentation and/or additional components, including hardware components such as hardware keys (dongles etc.) for using the software.

For transport to the medical imaging system and/or for storage on or in the medical imaging system, a computer-readable medium, for example a memory stick, a hard disk or some other transportable or permanently installed data carrier is used, on which the program sections of the computer program that can be read in and executed by a computer unit of the medical imaging system, are stored. The computer unit can comprise for example, one or more cooperating microprocessors or the like used for this purpose.

The dependent claims and the following description each contain particularly advantageous embodiments and developments of one or more example embodiments of the present invention. In particular, the claims of one claim category can also be further developed analogously to the dependent claims of another claim category. In addition, within the scope of the invention, the various features of different exemplary embodiments and claims can also be combined to form new exemplary embodiments.

In a variant of the method for automatically analysing 2D medical image data, including an external object, according to one or more example embodiments of the present invention the analysis is performed based on artificial intelligence. Artificial intelligence comprises preferably a deep learning based analytics method for evaluating the 2D medical image data. By using additional information from additional image data, the effort of training and the amount of training data for training the artificial intelligence based analysis, can be significantly reduced.

Preferably, the automatic image analysis comprises a separate first analysis of the additional image data and a separate second analysis of the 2D medical image data, based on the results of the first analysis. In that preferred variant, the analysis is structured as a sequential process, wherein firstly, the additional image data are analysed and the result of the first analysis is used for a second analysis of the actual 2D medical image data. Compared to an all-encompassing analysis, the sequential method enables to monitor the intermediate results of the analysis process, which improves transparency and the ability of validation of the analysis. Further, the variant exploits the possibility of a better visibility of external objects in the additional image data to improve subsequent medical image analytics applications based on the 2D medical image data. Furthermore, the extent of the training data basis for a dedicated image analysis application can be reduced based on the pre-analysis of the additional image data. Further, based on the analysis of the additional image data, the 2D image data can be divided in different sub-areas, which are then analysed using different analysis applications in the second analysis.

In a variant of the method for automatically analysing 2D medical image data, including an external object with the sequential analysis process, the first analysis comprises a step of identifying and/or localizing the external object in the additional image data. Advantageously, the identification and localisation of an external object in the additional image data can be used for selective adaption of the second analysis, which is applied to the medical image data themselves.

In a variant of the method for automatically analysing 2D medical image data, including an external object according to one or more example embodiments of the present invention, the additional image data comprise external image data. That means, that the external image data supply information about an outer side of a patient to be examined. Preferably, the external image data are acquired using an optical image acquisition device, especially preferred a camera. Advantageously, the external image data are complementary and complete the information about the interior of the patient to be examined. Further, using a camera exploits the visibility of extracorporeal objects on camera recordings to improve medical image analytics applications. Furthermore, advantageously, one or more example embodiments of the present invention can be implemented without additional hardware effort in future product versions comprising cameras as basic equipment, as for example mobile X-ray imaging systems.

In a variant of the method for automatically analysing 2D medical image data, including an external object according to one or more example embodiments of the present invention, the first analysis comprises a step of extracting information of the type and/or position of the external object from the external image data.

Then, the type of the external object is identified and/or the external object in the external image data is localized.

Based on the preceding identification and/or localization, a dedicated medical image analytics application is chosen for identifying and/or localizing the external object in the medical image data.

Further, the second analysis comprises the step of identifying and/or localizing the external object in the medical image data, based on the medical image analytics application.

Advantageously, the second analysis step can be adapted based on the first analysis, which reduces the effort for training a medical image analytics application used for the second analysis.

In a further variant of the method for automatically analysing 2D medical image data, including an external object according to one or more example embodiments of the present invention, the extraction step comprises the detection of the course of the external object in the external image data. Further, the step of choosing a dedicated medical image analytics application comprises an adaption of an analytics application with a focus on the detected course. Advantageously, a region can be defined, where an artefact due to the external object has to be suppressed.

The adaption can comprise considering the course of the external object by at least one of the following steps:
considering the course of the external object by
suppressing medical image regions of an overlaying external object, and/or
weighting segmentation or heatmap regression results, to avoid confusions by mimickers, and/or
treating separately medical image subregions with an overlaying external object. For example, broken bones are searched for in regions captured by plaster casts.

We can use segmentation or the heat map results to selectively suppress detection results of external objects that can be confused with internally inserted objects. For e.g. an ECG line, which is external, can be confused by a line detector algorithm with a CVC line (CVC=central venous catheter) that is internal. Having this additional modality, i.e for example a camera, we can detect this ECG line and suppress it to avoid false detections. Mimickers are objects or radiological signs that look similar to an object of interest.

Treating separately medical image sub-regions with an overlaying external object can be realized by two different analysis applications—one trained on image sub-regions with the overlaying object and one trained on image sub-regions without the overlaying object.

Advantageously, an adapted image analytics application can be restrained to a limited sub-portion of the examination portion, which helps to reduce the effort for the use of the adapted image analytics application.

In another variant of the method for automatically analysing 2D medical image data, including an external object according to one or more example embodiments of the present invention, the first analysis comprises the detection of an insertion point and/or a type of a partly extracorporeal device. For example, a basis image analytics application is merely focused on segmenting line/tube courses and tips inside the human body and does not consider the line/tube courses outside the patient. That additional information can be used for adapting the image analytics application such that also the extracorporeal part of the partly extracorporeal device is used for the image analysis.

In a further variant of the method for automatically analysing 2D medical image data, including an external object according to one or more example embodiments of the present invention, the partly extracorporeal device comprises a port catheter with a cover comprising a pattern, which slightly changes from tip to port device and the first analysis comprises at least one of:
identifying the type of the catheter based on the cover pattern,
localizing the insertion place of the port catheter based on the cover pattern,
estimating the insertion depth based on the cover pattern.

In a variant of the method for automatically analysing 2D medical image data, including an additional object, according to one or more example embodiments of the present invention, the analysis is performed as multi-model, artificial intelligence based analysis based on a combination of both different data sources, i.e. the additional image data and the 2D medical image data. Advantageously, an end-to-end-learning approach is realized, i.e. merely a single one model has to be trained for analysing the 2D medical image data and the additional image data. Deep neural networks are typically employed as analysis units to process various types of information in the multi-model approach.

The additional image data can also comprise a PET-image from the patient for analysing the metabolism in an examination area. For example, in the 2D medical image data, in the portion of the clavicle, a lesion like object is detected, which could result from a broken clavicle or a tumor. Since the tumor emits metabolism products, the additional PET-image can be used to analyse the 2D medical image data correctly. That means, in case the lesion like object emits metabolism products, it is proved that the 2D image data include a tumor. In case the lesion like object does not emit any metabolism products, the lesion like object may result from a broken clavicle.

Figure 1:
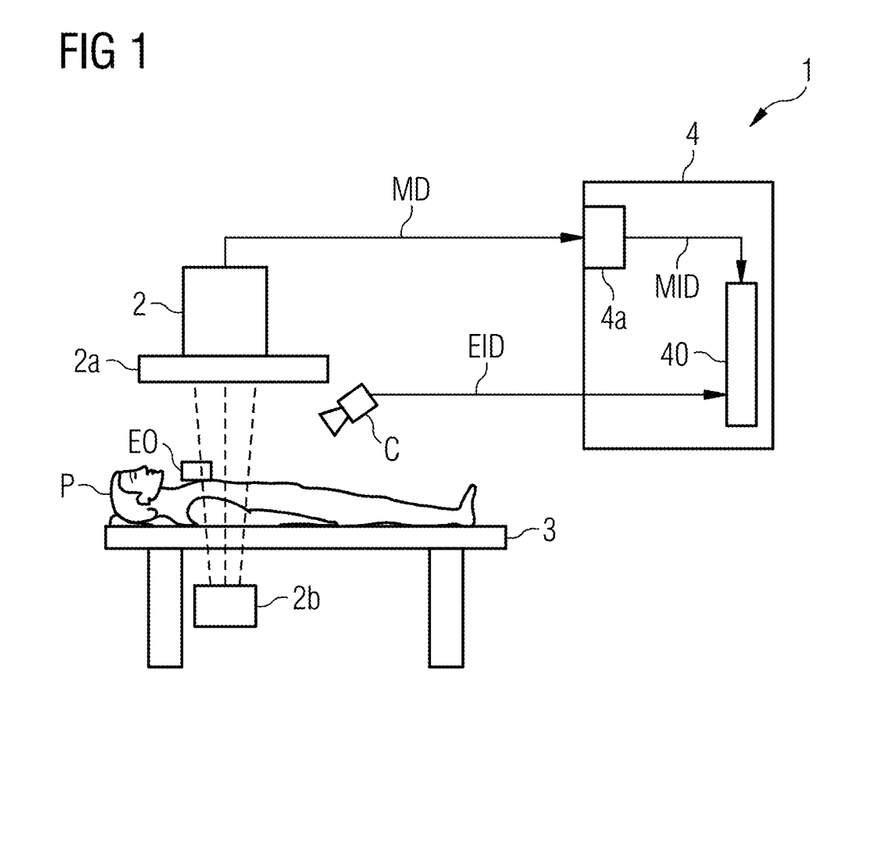
FIG. 1 shows an X-ray imaging system according to an embodiment of the invention.
Figure 4:
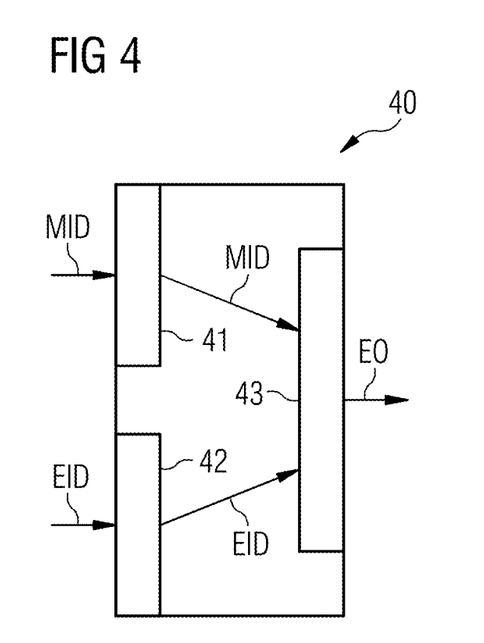
FIG. 4 shows a schematic view on an analysis device according to an embodiment of the invention.

FIG. 1 shows an X-ray imaging system 1, which comprises the analysis device 40 shown in FIG. 4 in detail. The X-ray imaging system 1 includes a conventional scan unit 2 comprising an X-ray detector 2a and an X-ray source 2b opposite the X-ray detector 2a. Further, there is a patient table 3, the upper part of which with a patient P on it can be moved to the scan unit 2 in order to position the patient P under X-ray detector 2a. On the patient P, an external object EO, for example an ECG-system, is placed. The scan unit 2 and the patient table 3 are controlled by a control device 4, from which acquisition control signals (not shown in FIG. 1) come for controlling the imaging process and which receives measuring data MD from the X-ray detector 2a. The control unit 4 also comprises a reconstruction unit 4a for reconstructing 2D medical image data MID based on the received measuring data MD.

Further, the X-ray imaging system 1 also comprises a camera C, which acquires external image data EID from the patient P and transmits these additional external image data EID to the control unit 4. The control unit 4 also includes the above-mentioned analysis device 40 according to one or more example embodiments of the present invention for an evaluation based on the 2D medical image data MID and the external image data EID.

The components of the analysis device 40 can be implemented predominantly or completely in the form of software elements on a suitable processor. In particular, the interfaces between these components can also be designed purely in terms of software. All that is required is that there are access options to suitable storage areas in which the data can be stored temporarily and called up and updated at any time.

Figure 2:
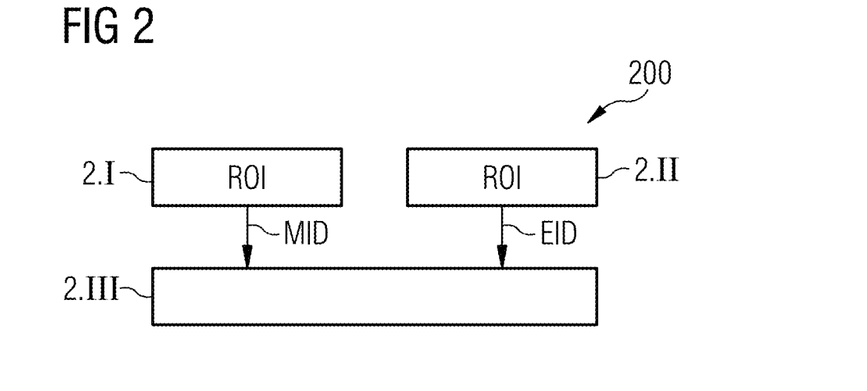
FIG. 2 shows a flow chart diagram illustrating a method for automatically analysing 2D medical image data, including an external object, according to an embodiment of the invention.

FIG. 2 shows a flow chart diagram illustrating the method for automatically analysing 2D medical image data MID, including an external object, according to an embodiment of the invention.

In step 2.I, 2D medical image data MID are acquired by an X-ray imaging system 1, as it is depicted in FIG. 1, from an examination portion ROI of a patient P.

In step 2.II, external image data EID are acquired from the examination portion ROI of the patient P using a camera C.

In step 2.III, external objects EO are identified and localized based on an analysis of the additional external image data EID and the 2D medical image data MID. A segmentation of the 2D medical image data MID is performed AI (AI=artificial intelligence) based and using the additional information from the external image data EID.

Figure 3:
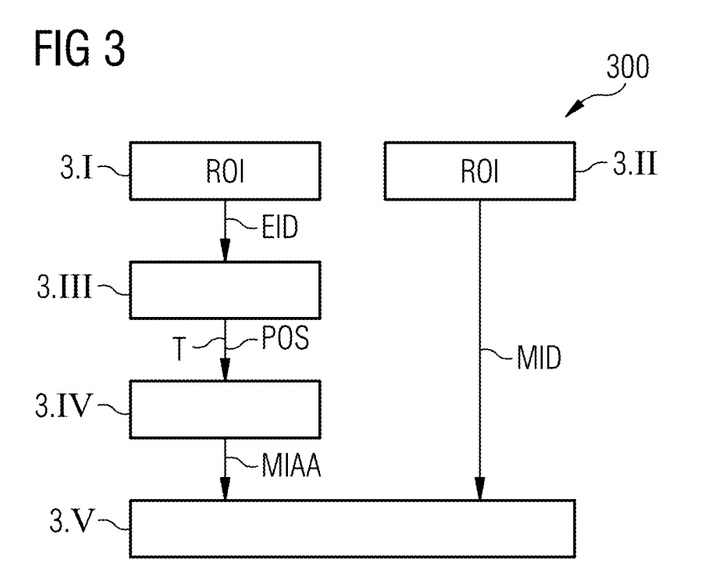
FIG. 3 shows a flow chart diagram illustrating a method for automatically analysing 2D medical image data, including an external object according to a second embodiment of the invention.

In FIG. 3, a flow chart diagram 300 is shown, which illustrates a method for automatically analysing 2D medical image data MID, including an external object EO, according to a second embodiment of the invention.

In step 3.I, external image data EID are acquired from an examination portion ROI of a patient P using a camera C.

In step 3.II, 2D medical image data MID are acquired by an X-ray imaging system 1, as it is depicted in FIG. 1, from the examination portion ROI of the patient P.

In step 3.III, information about the type T and position POS of the external object EO are taken from the acquired external image data EID and the type T of the external object EO is identified and the external object EO is localized in the external image data EID.

In step 3.IV, a dedicated medical image analytics application MIAA is chosen based on the preceding identification and localization. For example, if plaster casts have been identified as the external object, a dedicated medical image analytics application is chosen, which is different from the one being used for cases without plaster casts.

In step 3.V, the selected medical analytics application MIAA is applied on the 2D medical image data MID for segmenting the 2D medical image data MID and AI-based annotating and analysing the region of interest ROI.

In FIG. 4, a schematic view on an analysis device 40 according to a first embodiment of the invention is illustrated. The analysis device 40 comprises a first input interface unit 41 for receiving 2D medical image data MID of an examination object EO, for example X-ray image data of a chest region of a patient. The analysis device 40 also comprises a second input interface unit 42 for receiving additional external image data EID, acquired by a camera, also taken from the chest region of the patient. The analysis device 40 also encompasses an analysis unit 43 for identifying and/or localizing the external object EO based on an analysis of the additional external image data EID and the medical image data MID.

Figure 5:
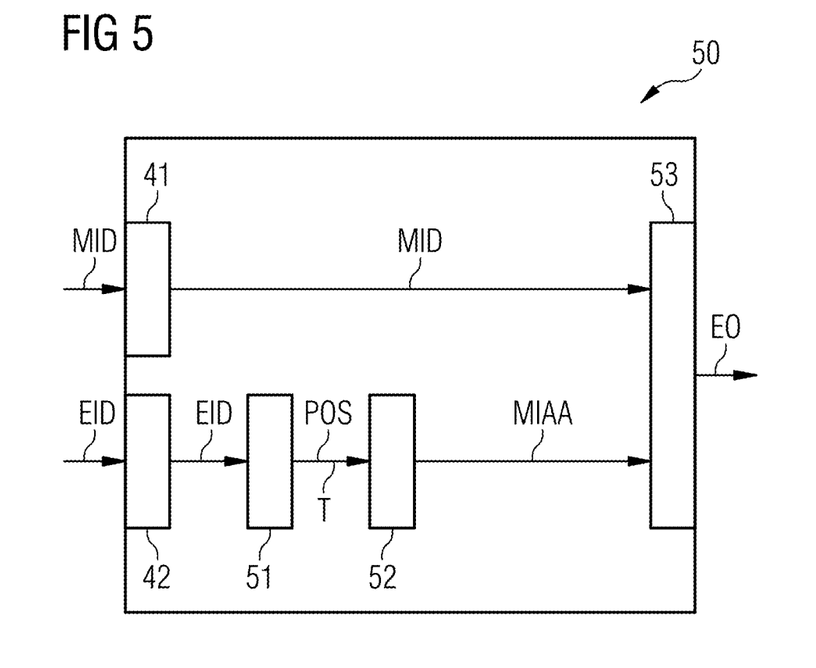
FIG. 5 shows a schematic view on an analysis device according to a second embodiment of the invention.

In FIG. 5, a schematic view on an analysis device 50 according to a second embodiment is illustrated.

Similar to the first embodiment, the analysis device 50 comprises an input interface unit 41 for receiving 2D medical image data MID of an examination object EO, for example CT image data of a chest region of a patient. The analysis device 50 also comprises a second input interface unit 42 for receiving additional external image data EID from a camera, also taken from the chest region of the patient.

In contrast to the first embodiment, the analysis device 50 according to the second embodiment comprises an object detection and localizing unit 51 for achieving information of the type T and position POS of the external object EO from the acquired external image data EID.

Further, the analysis device 50 comprises an application selection unit 52 for selecting a dedicated medical image analytics application MIAA based on the preceding identification of the type T and localization POS of the object EO Furthermore, the analysis device 50 encompasses an analytics unit 53 for applying the chosen application MIAA onto the acquired medical image data MID and emitting some results like segments, annotations etc.

Figure 6:
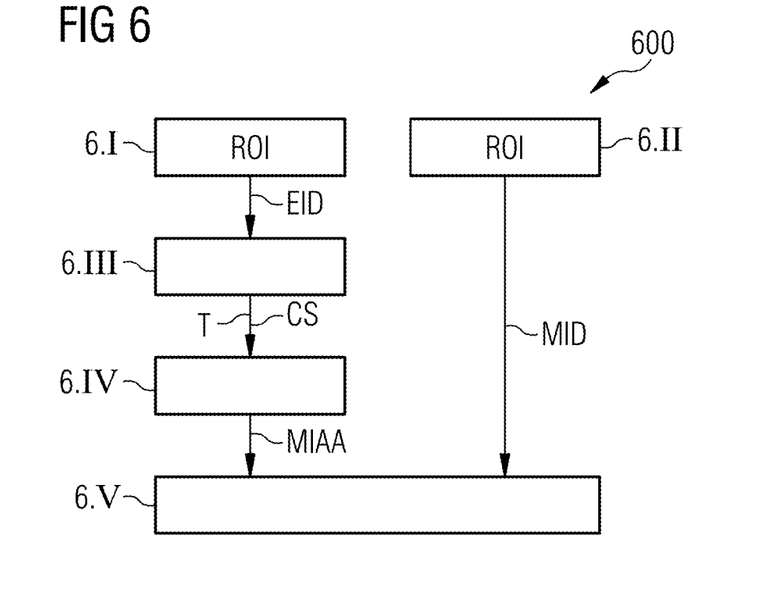
FIG. 6 shows a flow chart diagram illustrating a method for automatically analysing 2D medical image data, including an external object according to a third embodiment of the invention.

In FIG. 6, a flow chart diagram 600 is shown, which illustrates a method for automatically analysing 2D medical image data, including an external object EO, according to a third embodiment of the invention.

In step 6.I, external image data EID are acquired from an examination portion ROI of a patient P using a camera C.

In step 6.II, 2D medical image data MID are acquired by an X-ray imaging system 1, as it is depicted in FIG. 1, from the examination portion ROI of the patient P.

In step 6.III, information of the type T and the course CS of an external object EO, in that embodiment an ECG-cable, are extracted from the acquired external image data EID.

In step 6.IV, a dedicated medical image analytics application MIAA is chosen based on the preceding identification and localization. The dedicated medical image analytics application MIAA is modified such that medical image regions of overlaying external devices are suppressed in the analytics.

In step 6.V, the modified medical analytics application MIAA is applied on the 2D medical image data MID for segmenting the 2D medical image data MID and AI-based annotating and analysing the examination portion, i.e. the region of interest ROI. An alternative approach is a weighting of the results of the medical image analytics application, wherein segmentation results or heatmap regression results are weighted such that a confusion by mimickers is avoided.

Figure 7:
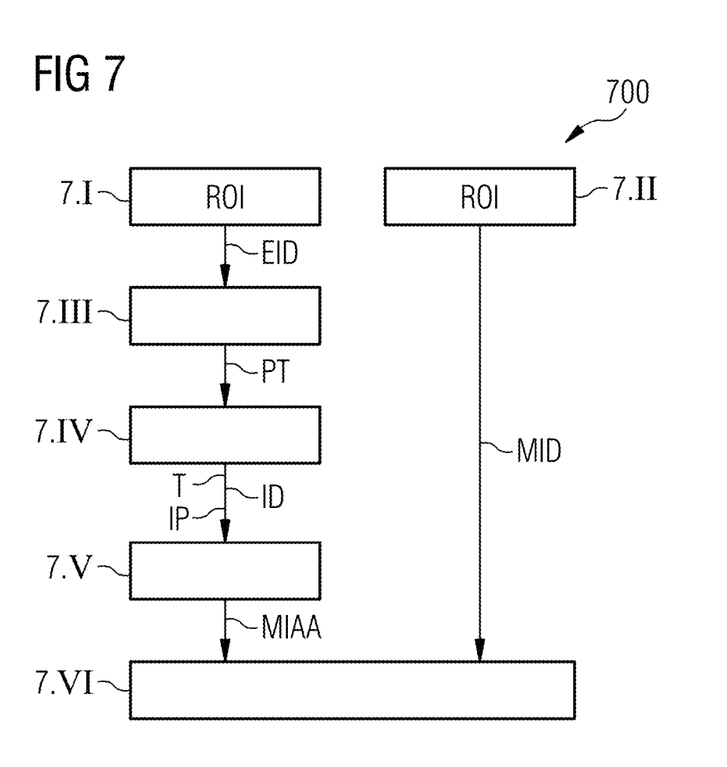
FIG. 7 shows a flow chart diagram illustrating a method for automatically analysing 2D medical image data, including an external object according to a fourth embodiment of the invention.

In FIG. 7, a flow chart diagram 700 is shown, which illustrates a method for automatically analysing 2D medical image data, including an external object EO, according to a fourth embodiment of the invention.

In step 7.I, external image data EID are acquired from an examination portion ROI of a patient P using a camera C.

In step 7.II, medical image data MID are acquired by an X-ray imaging system 1, as it is depicted in FIG. 1, from the examination portion ROI of the patient P.

In step 7.III, information about a cover pattern PT of a port catheter, which slightly changes from tip to port device, are extracted from the external image data EID.

In step 7.IV, the type T of the port catheter is automatically identified based on the distinctive cover pattern PT. Further, the insertion place IP of the port catheter is also localized based on the external image data EID and based on the determination of the visible end of the port catheter having also a dedicated pattern. Furthermore, the insertion depth ID is estimated based on the cover pattern PT at the insertion place IP, since the cover pattern PT slightly alters with the length of the catheter from port to tip.

In step 7.V, a medical analytics application MIAA is selected focusing on segmenting line/tube courses and tips inside the human body. Information about the line/tube courses outside the patient is received from the analysis of external image data EID in step 7.IV. In this manner, the whole port catheter from port to tip is automatically segmented and identified in detail in step 7.VI based on 2D image data MID and the information received in step 7.IV. The steps 7.III to 7.VI can be realized by automatic, preferably AI-based analysis applications, such that the method can be automatically carried out without any intervention of a human.

The above descriptions are merely preferred embodiments of the present disclosure but not intended to limit the present disclosure, and any modifications, equivalent replacements, improvements, etc. made within the spirit and principle of the present disclosure should be included within the scope of protection of the present disclosure.

Further, the use of the undefined article "a" or "one" does not exclude that the referred features can also be present several times. Likewise, the term "unit" or "device" does not exclude that it consists of several components, which may also be spatially distributed.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A method for automatically analysing 2D medical image data including an additional object, the method comprising:
    acquiring the 2D medical image data from an examination portion of a patient using a first modality;
    acquiring additional image data from the examination portion using a second modality, the second modality being different from the first modality; and
    performing an automatic image analysis based on the 2D medical image data and the additional image data, the automatic image analysis being adapted to the additional object, the additional object including an external object, and the performing including,
        performing a first analysis of the additional image data to obtain a first result, and
        performing a second analysis of the 2D medical image data based on the first result, the second analysis being separate from the first analysis, and the second analysis being subsequent to the first analysis.

2. The method of claim 1, wherein the performing performs the automatic image analysis as a multi-model, artificial intelligence based analysis based on a combination of the additional image data and the 2D medical image data.

3. A non-transitory computer readable medium storing program sections that, when executed by a computer unit, cause the computer unit to perform the method of claim 1.

4. The method of claim 1, wherein the performing the first analysis comprises at least one of:
    identifying the additional object in the additional image data; or
    localizing the additional object in the additional image data.

5. The method of claim 1, wherein the additional image data comprises external image data.

6. The method of claim 5, wherein
    the performing the first analysis includes,
        extracting information of at least one of,
            a type of the external object from the external image data, or
            a position of the external object from the external image data, identifying the at least one of,
                the type of the external object from the external image data, or
                the position of the external object from the external image data, choosing a dedicated medical image analytics application for at least one of, identifying the external object in the 2D medical image data, or localizing the external object in the 2D medical image data, the choosing being based on a preceding at least one of, identifying the external object in the 2D medical image data, or localizing the external object in the 2D medical image data;

the performing the second analysis includes, at least one of, identifying the external object in the 2D medical image data, or localizing the external object in the 2D medical image data; and the performing the second analysis being based on the dedicated medical image analytics application.

7. The method of claim 6, wherein the extracting comprises detecting a course of the external object in the external image data; and the choosing the dedicated medical image analytics application comprises adapting an analytics application.

8. The method of claim 7, wherein the adapting the analytics application comprises considering the course of the external object by at least one of:

suppressing medical image regions of an overlaying external object;

weighting segmentation or heatmap regression results; or treating separately medical image sub-regions with the overlaying external object.

9. The method of claim 1, wherein the performing the first analysis comprises detecting at least one of:

an insertion place of a partly extracorporeal device; or a type of the partly extracorporeal device.

10. The method of claim 9, wherein the partly extracorporeal device comprises a port catheter with a cover having a pattern, the pattern changing from a tip to a port of the port catheter; and the performing the first analysis comprises at least one of:

identifying a type of the port catheter based on the pattern, localizing an insertion place of the port catheter based on the pattern, or estimating an insertion depth based on the pattern.

11. The method of claim 1, wherein the additional image data comprises external image data.

12. The method of claim 4, wherein the performing the first analysis comprises detecting at least one of:

an insertion place of a partly extracorporeal device; or a type of the partly extracorporeal device.

13. The method of claim 5, wherein the performing the first analysis comprises detecting at least one of:

an insertion place of a partly extracorporeal device; or a type of the partly extracorporeal device.

14. The method of claim 6, wherein the performing the first analysis comprises detecting at least one of:

an insertion place of a partly extracorporeal device; or a type of the partly extracorporeal device.

15. An analysis device, comprising:

a first input interface configured to acquire 2D medical image data from an examination portion of a patient acquired by a first modality, the 2D medical image data including an additional object;

a second input interface configured to acquire additional image data from the examination portion using a second modality, the second modality being different from the first modality; and an analysis unit configured to perform an automatic image analysis based on the 2D medical image data and the additional image data, the automatic image analysis being, adapted to the additional object, the additional object including an external object, and the analysis unit being configured to perform the automatic image analysis including, performing a first analysis of the additional image data to obtain a first result, and performing a second analysis of the 2D medical image data based on the first result, the second analysis being separate from the first analysis, and the second analysis being subsequent to the first analysis.

16. A medical imaging system, comprising:

a scan unit configured to acquire measuring data from an examination portion of a patient;

a reconstruction unit configured to reconstruct image data based on the measuring data;

the analysis device of claim 15; and a modality configured to acquire additional image data from the examination portion, the modality being different from the scan unit.

* * * * *